United States Patent [19]

Puryear

[11] Patent Number: 4,463,914

[45] Date of Patent: Aug. 7, 1984

[54] DUAL MOUNTED BEARINGS FOR FISHING REEL

[75] Inventor: John W. Puryear, Tulsa, Okla.

[73] Assignee: Brunswick Corporation, Skokie, Ill.

[21] Appl. No.: 112,913

[22] Filed: Jan. 17, 1980

[51] Int. Cl.³ ............................................. A01K 89/01
[52] U.S. Cl. ............................... 242/84.1 J; 74/594.2; 242/84.2 A; 384/429
[58] Field of Search .................. 242/84.2 A, 84.2 R, 242/84.21 A, 84.21 R, 84.2 G, 84.2 F, 84.1 R, 84.5 A, 84.51 A, 84.1 J; 308/37, 238; 74/594.1, 594.2; 384/297, 299, 300, 429, 431

[56] References Cited

U.S. PATENT DOCUMENTS

| 2,495,621 | 1/1950 | Young et al. | 242/84.21 R |
| 2,745,607 | 5/1956 | Taggart et al. | 242/84.5 A |
| 3,946,963 | 3/1976 | Oberg | 242/84.51 A |
| 4,156,510 | 5/1979 | Hull | 242/84.2 R |

Primary Examiner—Billy S. Taylor
Attorney, Agent, or Firm—John G. Heimovics

[57] ABSTRACT

This invention comprehends a spin casting style fishing reel that has a main crank shaft that is mounted in two bearings located at the ends of the shaft. The bearings are mounted from outside the reel body thus permitting the crank shaft to be assembled at the back of the reel. The back cover plate acts to lock the bearings into place in the reel.

11 Claims, 8 Drawing Figures

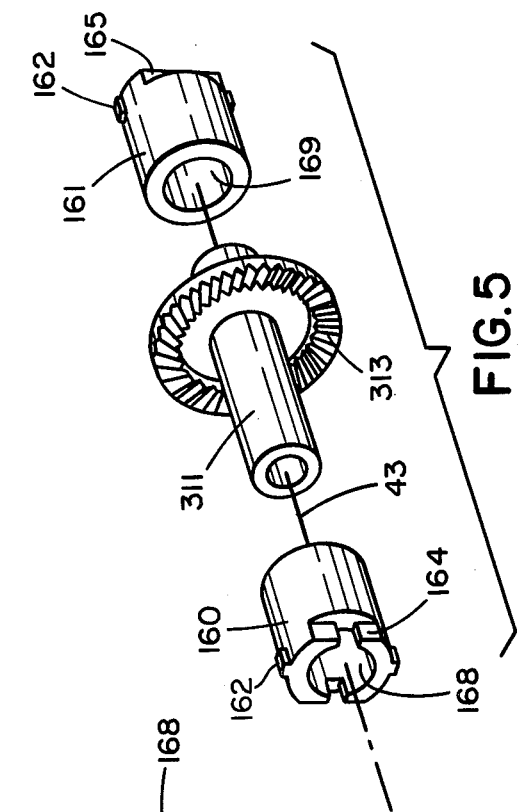
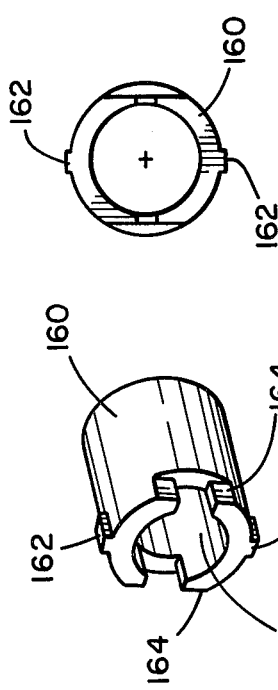
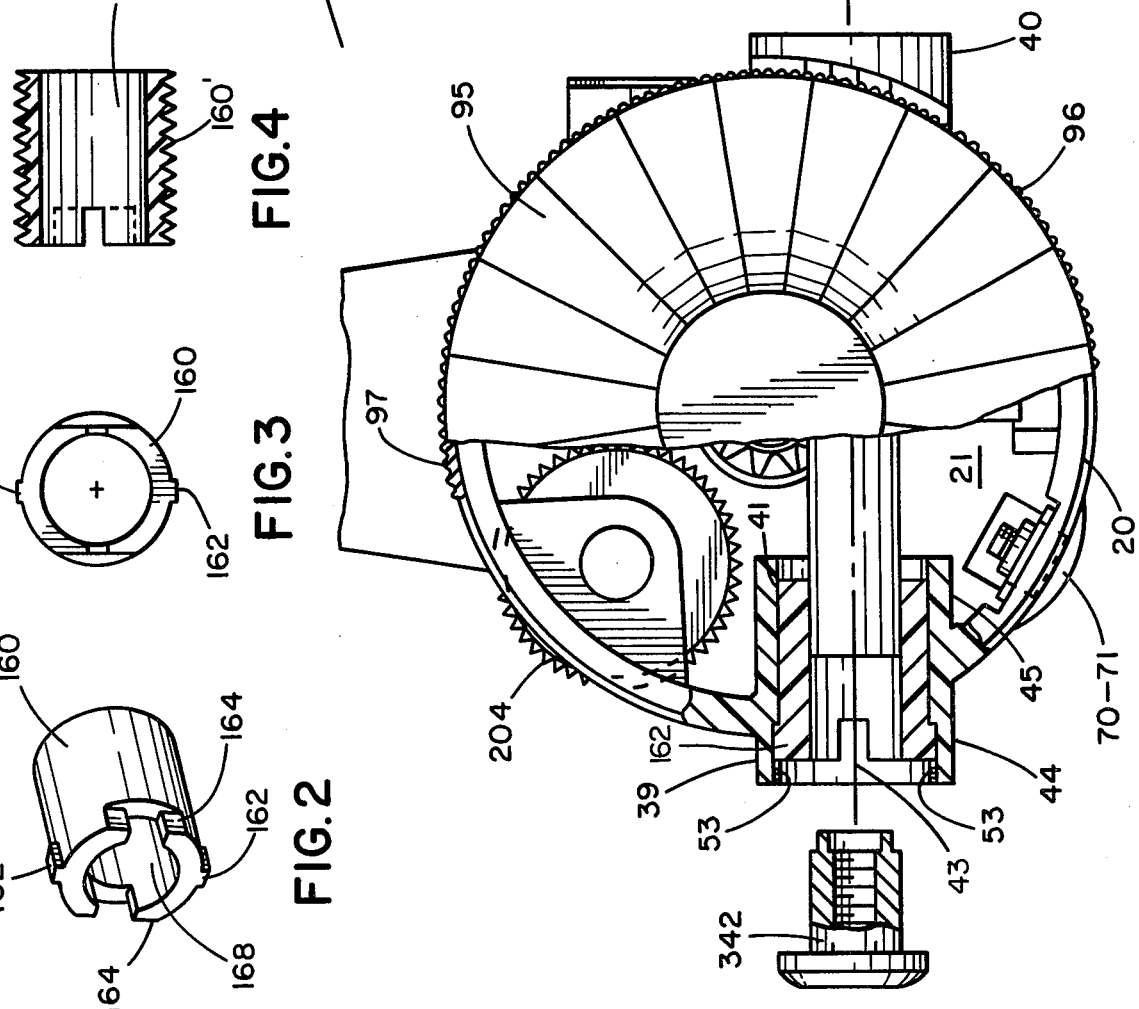
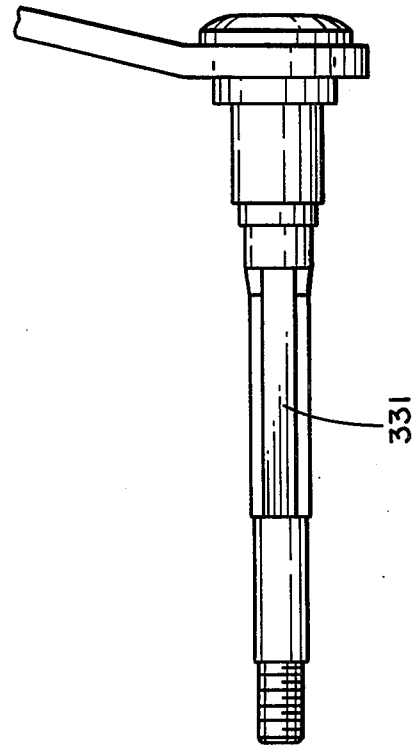

DUAL MOUNTED BEARINGS FOR FISHING REEL

BACKGROUND OF THE INVENTION

1. Field of the Invention

This invention relates to spinning style fishing reels, and more particularly, to spin casting style fishing reels having a dual bearing support system for the main crank shaft. This system enables the crank shaft to be placed into position by only opening the back part of the fishing reels. The bearings are mounted at the extremities of the fishing reel thus providing maximum support.

2. Background of the Prior Art

In small size spin casting style fishing reels, the mounting of the main bearing crank shaft within the reel has always been a problem. In U.S. Pat. No. 4,156,510 the main shaft and the drive gear are mounted within a U-shaped saddle providing either single or double bearing support. A retainer strap with one or more screws is required to hold the bearing in place. This method has not proved satisfactory because in order to clamp the bearing in place some bearings and/or bearing materials will be deformed by the retainer thus causing the bearing to be tight on the shaft making the fishing reel crank difficult to turn and causing excessive wear. This particular arrangement also requires an excessive number of parts.

Single bearing crank shaft mounting is taught in U.S. Pat. No. 2,991,957 where the support is a molded bearing that is part of a deck plate. Similar arrangements are shown in U.S. Pat. Nos. 3,020,665; 3,020,666; 3,041,002; 3,059,873; and 3,105,651. Other single bearing forms are taught in U.S. Pat. Nos. 3,469,799; 3,778,001; and 3,970,263.

In U.S. Pat. No. 3,836,092 a dual type of crank shaft support system is depicted using the clamping strap feature of U.S. Pat. No. 4,156,510. The dual support system as described can also clamp the bearings too tightly if very precise and costly manufacturing techniques are not used.

Thus, in all the prior art crank shaft support devices, obvious defects and deficiencies exist such as:

(1) too many parts;
(2) costly manufacturing techniques are required;
(3) excess wear on parts;
(4) bearing distortion;
(5) moment of inertia problems because of single bearing mounts; and,
(6) just poor design.

SUMMARY OF THE INVENTION

This invention relates to spin casting style fishing reels and contemplates a dual bearing support system for the main crank shaft that overcomes all the defects and deficiencies of the prior art.

It is therefore an object of this invention to provide a unique dual bearing mounting system for the main crank shaft of a spin casting type fishing reel whereby the manufacturing tolerances required provide for cost-saving manufacturing techniques.

It is another object of such an invention to provide co-axial bearing supports that are formed as part of the housing of the reel body.

It is yet another object of such an invention to provide bearings for the main crank shaft that can slide into the bearing supports on either side of the reel housing.

It is still another object of this invention to provide a rigid bearing support system for mounting the main crank shaft.

It is still yet another object of this invention to provide a means for retaining the bearings in the bearing supports.

The above and other further objects and features will be more readily understood by reference to the following detailed description and accompanying drawings.

DESCRIPTION OF THE DRAWINGS

FIG. 2 is a perspective view of one embodiment of the bearing of the invention described herein;

FIG. 3 is an end view of one embodiment of the bearing of the invention described herein;

FIG. 4 is a cross-sectional side view of another embodiment of the invention hereof wherein the outside surface of the bearing has an external thread;

FIG. 5 is an exploded perspective view of one aspect of the invention described herein;

FIG. 6 is a back elevation view of the fishing reel containing the invention with the view partially shown in cross section;

DESCRIPTION OF BASIC STRUCTURE AND OPERATION OF FISHING REEL

Figure 1:
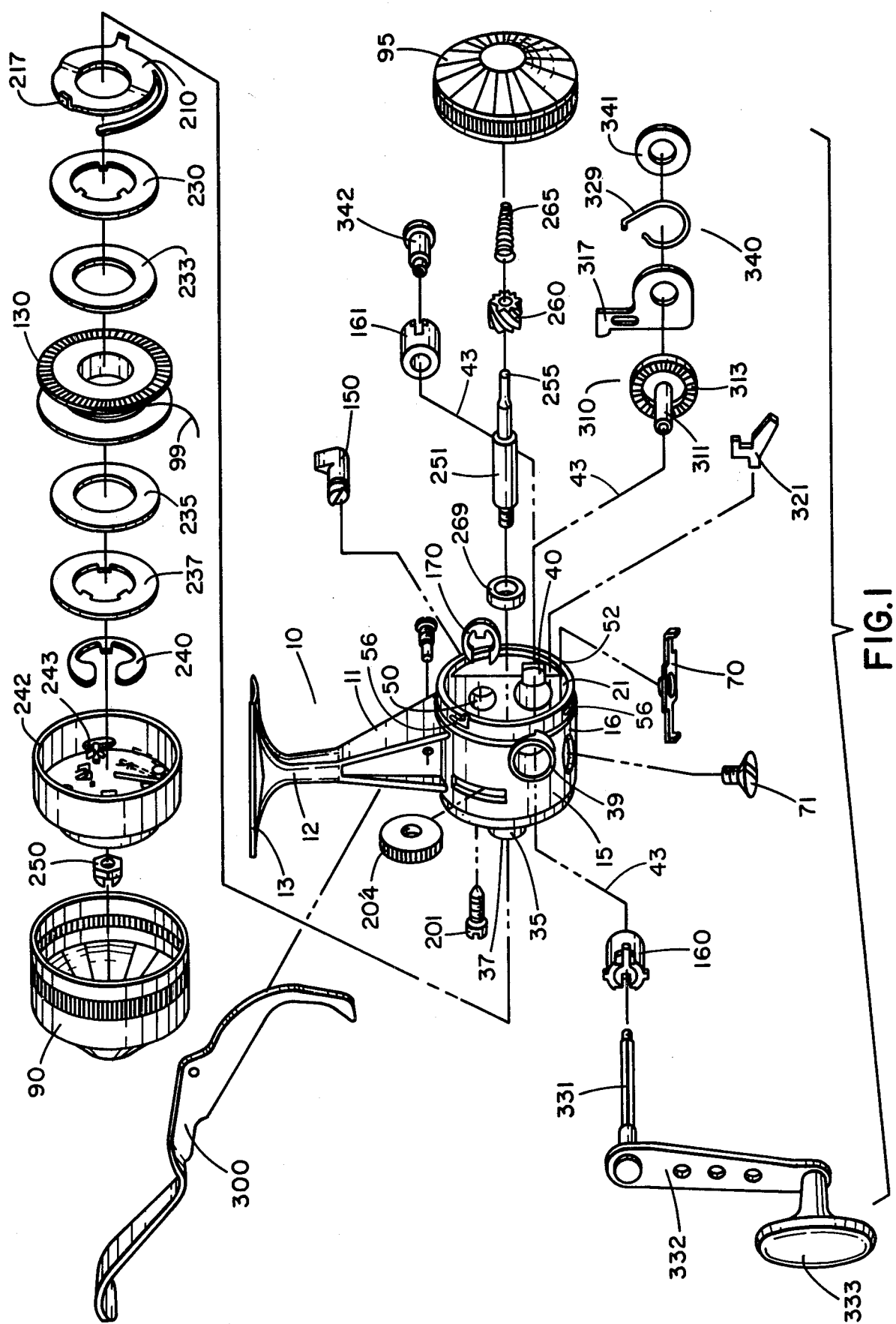
FIG. 1 is an exploded perspective view of the spin casting style reel containing the invention described herein.

In a fishing reel 10 of the spin casting type containing the preferred embodiments of the invention, FIG. 1 generally depicts an exploded perspective view of such a reel. A housing 11, preferably made of a plastic material such as Acrylonitrile Butadyene Styrene (ABS) or glass-filled polycarbonate, has a center deck plate 14 with a forward and rear body portions 15 and 16. A central hub 35 projects forward of the deck plate 14 with a drag plate 210, back spool washer 230, back flat drag washer 233, spool assembly 130, front flat drag washer 235, front spool washer 237, all secured to the hub 35 by means of spool retainer clip 240 which fits into a groove (not shown in FIG. 1). A center shaft 251 is mounted in a hole (not shown in FIG. 1) in hub 35 with the spinner head 242 mounted on the forward threaded end of the shaft 251 by means of nut 250. The spinner head 242 partially surrounds the forward flange of the spool 130 with fishing line 99 being wound thereon. A front cover 90 secured on the first forward body portion 15 has a front hole (not shown in FIG. 1) which acts as a fishing line guide as the line is cast from the reel and rewound after casting.

A clutch adjusting screw 201 is mounted in the interior 21 of the second body portion 16 with clutch wheel 204 mounted on screw 201. Tab 217 fits into the head of screw 201 and when the clutch wheel 204 is revolved upward toward stem 12 and screw 201 advances forward toward the spool retainer clip 240 increasing the clamping force on the spool 130 so that the ability of spool 130 to revolve relative to the hub 35 is decreased. When the wheel 204 is revolved away from the stem 12, the clamping force is decreased and the spool 130 is permitted to revolve relative to hub 35 thus creating the drag mechanism for the fishing reel 10. The center shaft 251 is slidably and rotatably mounted in bearing 269 which is mounted in the deck plate 14. Slidably mounted on center shaft 251 in the second body portion is pinion gear 260 and maintained in place by the center shaft spring 265.

A finger brake lever 300 is mounted on the housing 11 exterior the first body portion 15 and inside the second body portion 16 and being in operable contact with the distal end 255 of the shaft 251. When the exterior portion of the lever 300 is pulled upward toward the mounting foot 13, the center shaft 251 and the spinner head mounted thereon are pushed forward relative to the bearing 269 and the hub 35. The pickup pin mechanism 243 mounted on spinner head 242 cooperates with the cam mounted on the face of hub 35 to maintain the spinner head 242 in a forward position. In this forward position the fishing line 99 can be cast from the reel 10.

Crank assembly 310 is coupled with the anti-reverse assembly 340 which comprises a ratchet (on the back side of face gear 313 and not shown in FIG. 1), an anti-reverse drag arm 317, a drag spring 329 and spacer washer 341 all mounted on the hollow crank shaft 311. An anti-reverse pawl 321 is mounted in the deck plate 14 and received in between the back of the face gear 313 and drag arm 317 for engageable and disengageable contact with the ratchet. The crank assembly 310 is mounted in bearing supports 39 and 40 by sliding between slots in the supports 39 and 40. Crank bearings 160 and 161 mounted in supports 39 and 40 provide suitable bearings for the hollow shaft 311. A crank rod 331 is slip fitted into the hole in shaft 311 and keyed thereto. Crank rod nut 342 is secured to the threaded end to fasten rod 331 to the reel 10. The rod 331 is connected to the crank handle 332 and crank knob 333. The gear 313 is in engageable contact with pinion 260 so that when the crank handle 332 and knob 333 are rotated in the forward direction (toward the front cover) the crank shaft 251 rotates causing the spinner head 242 to rotate as well. This rotative motion disengages the pickup pin mechanism 243 from the hub 35 cam causing the spinner head 242 and shaft 251 to move rearward. This same motion causes the pickup pin of the mechanism 243 to extend outwardly beyond the spinner head 242 so that the fishing line 99 can be wound on the spool 130.

Anti-reverse actuator 150 is mounted in upper housing hole 50 and retained therein by retainer clip 170. The actuator 150 is in cooperative contact with the anti-reverse drag arm 317. In one position the actuator 150 disengages the anti-reverse assembly 340 permitting the crank rod 331 and the crank assembly to rotate in either the forward direction (upward toward the stem 12) or the reverse direction (downward from the stem 12 toward the back of the reel).

A back cover 95 is secured on the second back portion 16 to enclose the reel 10. Cover lock 70 is mounted within the housing 11 and is tightened in place by screw 71 clamping the covers 90 and 95 to the housing.

DESCRIPTION OF THE PREFERRED EMBODIMENTS

In a preferred embodiment of the invention as shown in FIGS. 2–8, the invention contemplated is a rigid dual bearing mounting system for the main crank shaft. The crank shaft assembly 330 with the anti-reverse arm 317, spring 329, face gear 313, ratchet 316, and washer 340 are all mounted on the hollow crank shaft 311. The shaft 311 and its parts are uniquely mounted within the interior 21 of the back portion 16 of the reel 10. Bearing supports 39 and 40 are formed as part of the housing 11 and have co-axial holes 41 and 42 therein. The supports 39 and 40 extend outside the reel 10 at 44 and 47 and project into the interior of the back portion 21 at 45 and 48. The interior projections 45 and 48 have rearwardly projecting slots 46 and 49 that are wider than the maximum diameter of the hollow crank shaft 311. Thus, the hollow crank shaft 311 can be easily mounted from the back of the reel by slipping the shaft 311 into the slots 46 and 49. Bearings 160 and 161 with holes 168 and 169 are pushed into the support holes 41 and 42 from outside the reel 10 with the shaft 311 being captured by the bearings 160 and 161 and mounted in holes 168 and 169. At the same time as receiving the shaft 311 in the bearing holes 168 and 169, the slots 46 and 49 are closed off by the bearings 160 and 161 such as shown on the left-hand side of FIG. 6. In this manner the shaft is not tightly clamped such as in prior art designs. Since there is one common axis 43, alignment with the center shaft 251 is simple to accomplish when initially making the housing 11.

The bearing support holes 41 and 42 have inwardly projecting niches 53 for receiving the bearing tabs 162 which act to align the bearings 160 and 161 in the supports 39 and 40. Furthermore, this arrangement prevents rotation of the bearings 160 and 161 in supports 39 and 40 thus enabling the bearings to be made from the same material as the housing 11, if desired. On each side of the bearings 160 and 161 approximately 90° with respect to tabs 162 are undercuts 164 and 165 resulting in the bearings being symmetrical.

Figure 7:
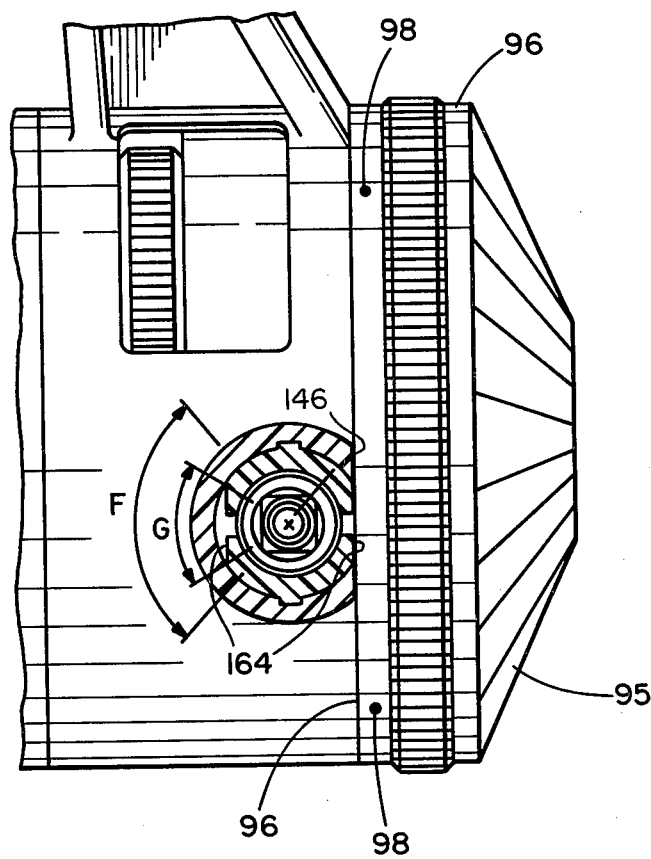
FIG. 7 is a partial cross-sectional view of a partial side elevation of part of the back portion of the fishing reel containing the invention described herein; and, FIG. 8 is a back elevation view of the fishing reel containing the invention described herein wherein the bearings are shown outside the reel just before being pushed into place supporting the main crank shaft and closing the entry slots.
Figure 8:
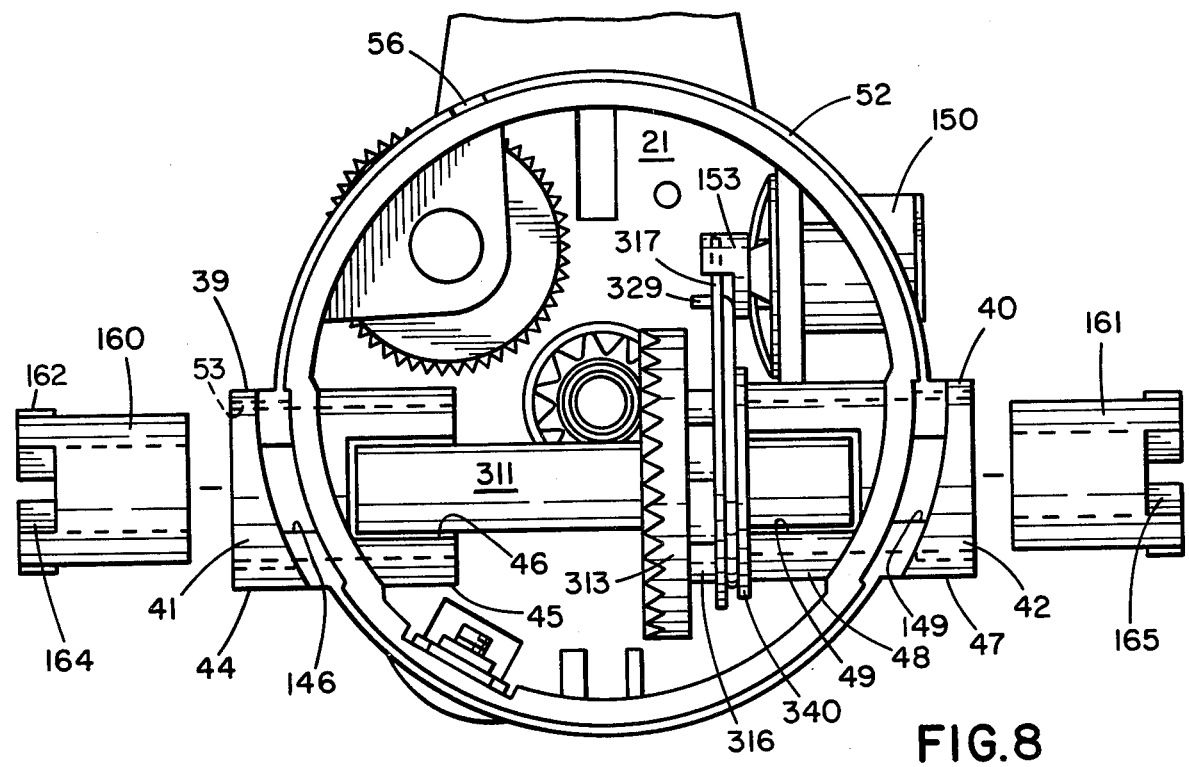

The extensions 44 and 47 of the bearing supports 39 and 40 have cutout slots 146 and 149 that comprise removed portions of the bearing supports and are on the exterior 20 of the second body portion 16. These cutout slots 146 and 149 are best seen in FIGS. 7 and 8. The slots 146 and 149 are sufficiently deep so that the wall of the supports are completely cut through from the exterior surfaces 44 and 47 to the holes 41 and 42. As shown in FIG. 7, the cutout slots 146 and 149 comprise an included angle ranging from about 60° ("G") to about 90° ("F"). Obviously the degrees will vary depending upon the thickness between the internal hole and the external surface of the bearing supports. The cutout slots 146 and 149 must be sufficiently deep to align with the undercuts 164 and 165 of bearings 160 and 161.

When the shaft 311 is mounted in the bearings 160 and 161 which are in turn mounted in bearing supports 39 and 40, the undercuts 164 and 165 are aligned with the cutout slots 146 and 149 by means of tabs 162 and 163 and niches 53. The back cover 95 has a forwardly projecting lip 96 with an internal surface 97. The internal surface 97 has a diameter slightly larger than the recess for the back cover 52 enabling the lip 96 to slip snugly over the recess 52 up to and against the slots 146 and 149 and the undercuts 164 and 165. Thus, the back cover 95 prevents the bearings 160 and 161 from sliding out from the bearing supports 39 and 40. In order to secure the cover in place, the lip 96 has several inwardly projecting detents 98. The recess 52 also has several L-shaped niches 56 for receiving the detents 98. After the back cover 95 has been positioned on the recess 52, it is slightly rotated so that the detents 98 lock into the niches 96 thus keeping the cover 95 tightly secured to the reel.

The foregoing description of the preferred embodiments in the invention provide a highly desirable dual bearing mounting system for the main crank shaft which is proven quite superior to the prior art systems. Further, it has been found that the invention provides a much more rigid mounting system for the crank shaft and that such an arrangement eliminates the moment of inertia created by single-bearing crank shaft mounting systems of the prior art. Also, the bearing mounting system provides for ease of manufacturing since it does not require close manufacturing tolerances to make the system operate properly.

In another embodiment of this invention, the bearing supports can have internal threads therein and the bearings can have external threads thereon whereby the bearings can be screwed into the supports instead of being retained by the back cover. An example of an externally-threaded bearing 160' is shown in FIG. 4.

It should be understood, of course, that the specific forms of the invention illustrated and described herein are intended to be representative only, as certain changes and modifications may be made without departing from the scope of the teachings disclosed herein. Accordingly, references should be made to the appended claims in ascertaining the full scope of the invention.

What is claimed is:

1. A spinning style fishing reel comprising:
   (a) a housing having a deck plate and body portions with exterior and interior surfaces, a first portion projecting forward of the deck and a second portion projecting rearward of the deck;
   (b) a pair of tubular bearing supports mounted in the second portion and having projections extending exterior of the exterior surface and interior of the interior surface, the supports each having:
      (i) a through hole in axial alignment with the other,
      (ii) a slot in the part of the support extending interior of the interior surface and opening rearwardly of the deck to expose said hole; and
      (iii) a small niche formed in each bearing support;
   (c) gear crank assembly means positioned in the bearing support by sliding through the slots; and
   (d) tubular bearing means mounted in the hole in each support by endwise insertion into the hole and surrounding and supporting the crank assembly means and closing the slots, said bearing means having tabs that align with the small niches and prevent the bearing means from rotating relative to the supports.

2. A spinning style fishing reel comprising:
   (a) a housing having a deck plate and body portions with exterior and interior surfaces, a first portion projecting forward of the deck and a second portion projecting rearward of the deck;
   (b) a pair of tubular bearing supports mounted in the second portion and having projections extending exterior of the exterior surface and interior of the interior surface, the bearing supports each having:
      (i) a through hole in axial alignment with the other,
      (ii) a slot in the part of the support extending interior of the interior surface and opening rearwardly of the deck to expose said hole; and
      (iii) a groove in the exterior projection that is exterior of the second portion;
   (c) gear crank assembly means positioned in the bearing support by sliding through the slots; and
   (d) tubular bearing means mounted in the hole in each support by endwise insertion into said hole and surrounding and supporting the crank assembly means and closing the slots, said bearing means having undercuts aligned with the grooves.

3. The reel of claim 2 including a back cover plate having a lip projecting forwardly from the rear thereof with inner and outer surfaces and which fits around a part of the second portion and into the grooves and undercuts locking the bearing means in the supports.

4. The reel of claim 3 wherein the exterior surface of the second portion has a recessed surface niche.

5. The reel of claim 4 wherein the inner surface of the back cover plate has a detent.

6. The reel of claim 5 wherein the lip fits around a part of the second portion and into the grooves and undercuts locking bearing means in the supports and the detent cooperates with the surface niche to lock the cover plate to the housing.

7. A fishing reel having a gear crank assembly with a shaft having an outer diameter, a housing with a deck plate, a pair of tubular bearing supports mounted to the deck plate in spaced-apart relation and extending inwardly of the perimeter of the housing for mounting the shaft of the gear crank assembly, each bearing support having a generally cylindrical through hole with the holes being in axial alignment transversely of the reel, a slot in the wall of each bearing support opening away from the deck plate, the walls of the slot being spaced apart an amount greater than the diameter of the shaft to permit transverse movement of the shaft into a position of alignment with the holes, the walls of the slot being spaced apart an amount less than the diameter of the through holes, and tubular bearing means having an outer diameter approximately equal to the diameter of the through holes mounted in the hole in each bearing support by endwise insertion over the ends of the shaft for support thereof and for blocking of the shaft from access to the slots.

8. A fishing reel having a gear crank assembly with a shaft having an outer diameter, a housing with a deck plate, a pair of bearing support means for mounting the shaft of the gear crank assembly, the bearing support means being mounted to the rear of said deck plate in spaced apart relation, each bearing support means having a through hole with the holes being in axial alignment transversely of the reel, a slot in the wall of at least one of the bearing support means opening in a direction other than toward the deck plate, the slot being defined by walls spaced apart by an amount greater than the diameter of the shaft to permit transverse movement of the shaft into a position of alignment with the holes, the diameter of the through hole connected to the slot is at least equal to the space between the walls of the slot, and bearing means having an outer diameter approximately equal to the diameter of the through hole in the bearing support means having the slot, the bearing means being mounted in the hole in the bearing support means having the slot by endwise insertion over the end of the shaft for support thereof and for blocking of the shaft from access to the slot.

9. A fishing reel as claimed in claim 8 wherein each bearing support means has a slot in the wall opening into the through hole, the widths of each slot being less than the diameter of the through holes, and separate bearing means mounted in each through hole over both ends of the shaft.

10. A fishing reel having a housing with a deck plate, a pair of bearing supports mounted to the rear of the deck plate in spaced apart relation for mounting a shaft of a gear crank assembly, each bearing support having a through hole with the holes being in axial alignment transversely of the reel, a slot in the wall of at least one bearing support opening away from the deck plate and being of a width to permit transverse movement of the shaft into a position of alignment with the holes, the width of the slot being less than the diameter of the through hole connected to the slot, and bearing means having an outer diameter approximately equal to the diameter of the through hole connected to the slot, the bearing means being mounted in the hole connected to the slot by endwise insertion over the end of the shaft for support thereof and for blocking of the shaft from access to the slot.

11. A fishing reel as claimed in claim 8 wherein a slot is formed in the wall of both bearing support means, each slot being defined by walls spaced apart an amount greater than the diameter of the shaft to permit transverse movement of the shaft into a position of alignment with the holes and wherein bearing means are mounted in each bearing support means by endwise insertion over the end of the shaft.

* * * * *